Aug. 18, 1936.  F. G. PURINTON ET AL  2,051,777
COMPARTMENT RECEPTACLE AND HUMIDIFIER FOR CIGARETTES AND THE LIKE
Filed June 1, 1935
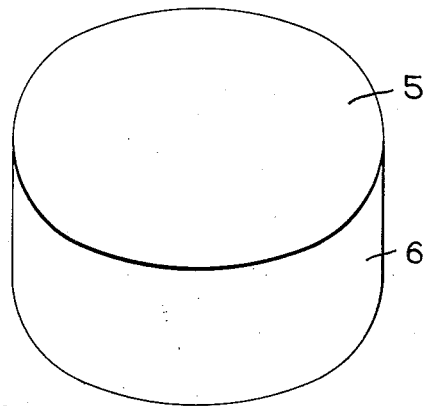
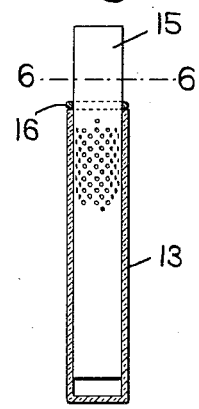
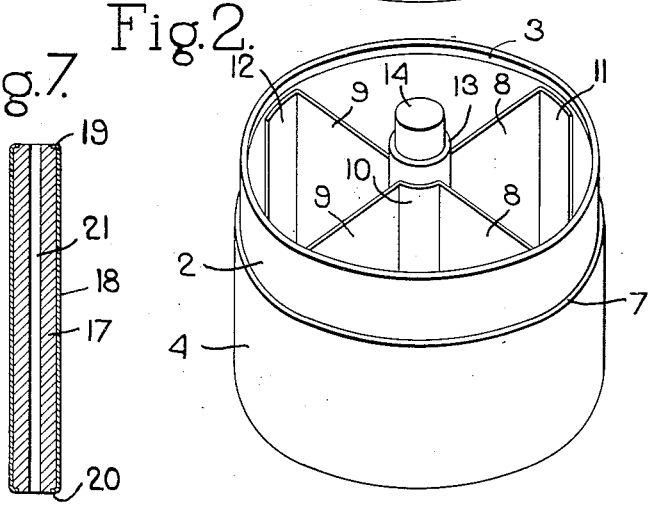
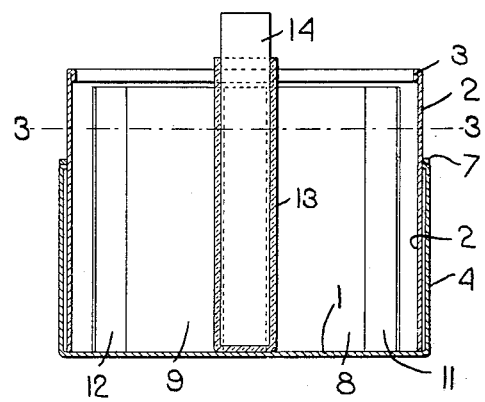
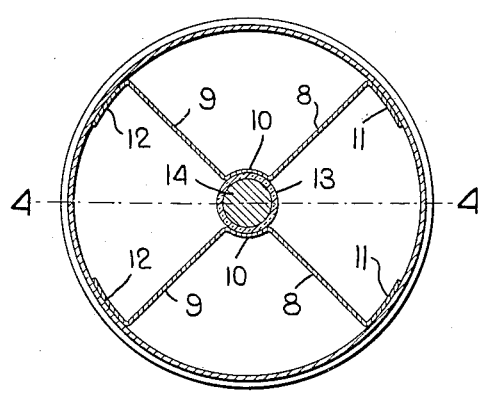
Inventors.
Forrest G. Purinton
William A. Zwiebel
by Heard Smith & Tennant.
Attys Patented Aug. 18, 1936

2,051,777

UNITED STATES PATENT OFFICE 2,051,777

COMPARTMENT RECEPTACLE AND HUMIDIFIER FOR CIGARETTES AND THE LIKE

Forrest G. Purinton and William A. Zwiebel, Waterbury, Conn., assignors to The Patent Button Company, Waterbury, Conn., a corporation of Connecticut Application June 1, 1935, Serial No. 24,552

11 Claims. (Cl. 131—30)

This invention relates to improvements in compartment receptacles, and more particularly to containers and humidifiers for cigarettes and the like, and the object thereof is to provide a compartment receptacle of simple and efficient construction which can be conveniently made with a minimum number of parts and readily assembled.

Another object of the invention is to provide a compartment receptacle of the character described in which the partitions are so constructed that when assembled the moisture absorbent member may be removably held in position by the assembled partitions.

A further object of the invention is to provide a container and humidifier for cigarettes and the like comprising a central tubular member, preferably of glass, adapted to contain a liquid absorbent member, with means for adjusting the liquid absorbent member so that the amount thereof projecting above the tubular member, which contains it, may be readily adjusted, thereby enabling vapor to be delivered to the contents of the container at the proper rate.

These and other objects and features of the invention will more fully appear from the following description and the accompanying drawing and will be particularly pointed out in the claims.

A preferred embodiment of the invention is shown in the drawing, in which,

Fig. 1 is a perspective view of the cover of a cylindrical container embodying the invention;

Fig. 2 is a perspective view of a preferred form of container and humidifier;

Fig. 3 is a horizontal sectional view on line 3—3 Fig. 4;

Fig. 4 is a vertical sectional view on line 4—4 Fig. 3;

Fig. 5 is a detail view in vertical section showing a glass tubular container for a liquid absorbent member which is adjustably mounted therein; and, Fig. 6 is a horizontal sectional view on line 6—6 Fig. 5, and, Fig. 7 is a vertical longitudinal sectional view of a modified form of liquid absorbent member.

The compartment receptacle shown in the drawing is of cylindrical form, but may be made of rectangular, octagonal, or any other suitable design. The casing comprises a base 1 and a peripheral wall 2, preferably extending vertically upwardly therefrom, the upper end of the wall 2 desirably being inturned to provide a bead 3. For convenience in construction, the vertical wall 3 may be made separate from the base and the base may be in the form of a cup having a flange 4 closely enclosing the peripheral wall 2. By reason of this construction a cover 5 having a cylindrical wall 6 may be provided to fit over the peripheral wall 2 in such manner as to be flush with and form a continuation of the wall 4. Desirably a cushion, such as a rubber band 7, may be mounted upon the peripheral member 2 at the top of the flange 4 to deaden any metallic sound when the cover is put on and insure complete closure of the receptacle.

One of the principal objects of the invention is to provide partitions, for dividing the compartment into a plurality of sections, of such form and construction that they can be readily assembled within the casing or removed therefrom, the partitions preferably being so constructed that when in assembled position they will provide a central space to receive a liquid absorbent member or a tubular receptacle for said liquid absorbent member.

In the particular construction illustrated in the drawing two complementary partition members are employed each comprising wide walls 8 and 9, preferably of thin resilient sheet metal, united by an integral narrow wall 10 which desirably is concavely curved concentric with the periphery of the casing, and is adapted, when the partition members are assembled in the casing, to provide a space between said narrow walls 10 to receive a liquid absorbent member, or preferably a tubular container for the same.

The outer ends of the wide walls 8 and 9 of the partition members are provided with laterally extending flanges 11 and 12 resiliently to engage the peripheral wall of the casing.

In the preferred construction illustrated the concave narrow walls 10 of the partition member engage diametrically opposite sides of a cylindrical container 13, preferably in the form of a glass vial which contains a liquid absorbent member.

The liquid absorbent member may be in the form of a rigid stick of baked clay, or other absorbent material, such as diatomaceous earth, united by plaster of paris, or other suitable binder, and preferably in the form of a cylinder 14, as illustrated in Figs. 2 and 4, of sufficient length to project slightly above the end of the glass vial in which it is contained, or may comprise a perforated metal shell 10 containing the absorbent material, in which the casing not only serves to prevent breakage of the stick of absorbent material, but also to permit the liquid to be absorbed readily through the perforations in the casing.

Suitable means may if desired be provided which will permit the adjustment of the absorbent member relative to its container, so that a greater or less portion will be exposed above the upper end thereof. A convenient device, which is illustrated herein, comprises a ring 16 of resilient material adapted frictionally to engage the periphery of the absorptive member or its casing, and when the absorbent member is inserted in the container to rest upon the top of the container, as illustrated in Fig. 5.

Another device for supplying moisture to the air within the container is illustrated in Fig. 7 which comprises a stick 17 of diatomaceous earth, or other suitable material, united by a suitable binder enclosed in a shell 18, the ends 19 and 20 of the shell desirably being turned inwardly to prevent the material from falling out in case of breakage. Desirably the absorbent member is provided with a suitable aperture or bore 21 to facilitate absorption of the liquid when immersed or when poured through it and which also exposes a greater surface from which evaporation may take place. The ends of the shell 15 may be similarly turned inwardly at the ends for like purposes. Where the material is thus enclosed within a shell of rigid material less binder is required than would be necessary if the absorbent member were not so protected.

By reason of this construction a large proportion of the absorbent member may be enclosed within the glass vial or container, so that the moisture will be given out at a low rate over a long period and only occasionally has to be saturated to keep it in good working order.

While only two partition members are illustrated in the accompanying drawing, it is obvious that three or more of such partition members properly constructed may be employed if it is desirable to divide the container into a larger number of compartments. In the manufacture of compartment receptacles as above described, the partition members may be made of identical construction and stamped out by a single set of dies. They can be assembled within a casing without the use of any fastenings, such as rivets, screws, solder, etc., by merely placing the partitions in the casing in proper position and then inserting the moistening member, or preferably its enclosing vial, between the narrow walls of the partition members, thereby expanding them sufficiently to cause their flanged ends frictionally to engage the peripheral wall of the casing. It is obvious that the partition members may be so formed that the narrow portions of their partition walls may abut in such manner as to form a compartment box without the central space to receive the container for the absorbent member, or that they may be so formed that when the edges of the central portions are in abutting relation they will form a space into which the absorbent member may be placed without the necessity of a protective casing. It will also be obvious that more than two suitably shaped partition members of the character above described may be provided to divide the container into a greater number of compartments.

It will therefore be understood that the particular embodiment of the invention herein disclosed is of an illustrative character and is not restrictive of the meaning and scope of the following claims.

Having thus described the invention, what is claimed as new, and desired to be secured by Letters Patent, is:

1. A compartment receptacle and humidifier for cigarettes and the like comprising a casing having a base and a peripheral wall, and a plurality of separate, removable, complementary partition members each comprising two walls converging from the peripheral wall of said casing toward a common center and connected by a narrow integral wall providing, when the partition members are assembled in said casing, a space between said narrow walls to receive a liquid-absorbent member and a removable cover for said casing.

2. A compartment receptacle and humidifier for cigarettes and the like comprising a casing having a base and a peripheral wall, a plurality of separate, removable, complementary partition members each comprising two walls converging from the peripheral wall of said casing toward a common center and connected by a narrow concave integral wall and adapted when the partition members are assembled in said casing to provide a cylindrical space between said narrow walls, a rigid stick of liquid absorbent material enclosed in a metallic shell within said space, and a removable cover for said casing.

3. A compartment receptacle comprising a casing having a base and a vertical peripheral wall extending upwardly therefrom, a plurality of separate, removable, resilient partition members each having converging wide walls united by a narrow integral central wall, a central tubular member containing a liquid absorbent material resiliently clamped between and supported by said central walls when the partitions are assembled within the casing with the outer end portions of said wide walls engaging the peripheral wall of the casing and a cover telescopically fitting said casing.

4. A compartment receptacle comprising a casing having a base and a vertical peripheral wall extending upwardly therefrom, a plurality of separate, removable, partition members of thin resilient material each having converging wide walls provided with flanged ends and united by a narrow integral central wall, and a central tubular member containing a liquid absorbent material clamped between said central walls when the partitions are assembled within the casing with the flanged outer end portions of said wide walls engaging the peripheral wall of the casing.

5. A compartment receptacle comprising a casing having a base and a vertical peripheral wall extending upwardly therefrom, a plurality of separate, removable, partition members of thin resilient metal each having converging wide walls united by a narrow integral central wall, a central tubular receptacle, containing a removable, rigid, fluid absorbent member, clamped between said central walls when the partitions are assembled within the casing with the outer end portions of said wide walls engaging the peripheral wall of the casing, a rigid stick of liquid absorbent material within said tubular member and extending above the upper end thereof, and a cover for said casing.

6. A compartment receptacle comprising a casing having a base and a vertical peripheral wall extending upwardly therefrom, a plurality of partition members of thin resilient sheet metal, each having converging wide walls united by a narrow integral central wall and having flanged outer end portions, a central tubular member engaged and supported by said central walls when the partitions are assembled within the casing with the flanged outer end portions of said wide walls engaging the peripheral wall of the casing, a cylindrical shell containing a rigid stick of liquid absorbent material within said tubular member and extending above the upper end thereof, means for holding said liquid absorbent member contained in said shell in adjusted positions so that the greater or less portion thereof may extend beyond the end of said tubular member, and a cover for said casing.

7. A compartment receptacle comprising a casing having a base and a vertical peripheral wall extending upwardly therefrom, a plurality of partition members of thin sheet metal each having converging wide walls united by a narrow, integral, concave, curved, central wall, a tubular glass member engaged and supported by said curved central walls when the partitions are assembled within the casing, with the outer ends of said partition walls engaging the peripheral wall of the casing, a metallic cylindrical shell containing an absorbent material removably mounted within said tubular glass member, and means permitting free admission of liquid to the absorbent material within said shell.

8. A compartment receptacle comprising a casing having a base and a vertical peripheral wall extending upwardly therefrom, a plurality of partition members of thin sheet metal, each having converging wide walls united by a narrow, integral, concave, curved, central wall, a tubular glass member engaged and supported by said curved central walls when the partitions are assembled within the casing, with the outer ends of said partition walls engaging the peripheral wall of the casing, a perforated cylindrical shell containing an absorbent material detachably mounted within said tubular glass member, and means for securing said perforated member in adjusted positions.

9. A compartment receptacle comprising a casing having a base and a vertical peripheral wall extending upwardly therefrom, a plurality of partition members of thin sheet metal, each having converging wide walls united by a narrow, integral, concave, curved, central wall, a tubular glass member engaged and supported by said curved central walls when the partitions are assembled within the casing, with the outer ends of said partition walls engaging the peripheral wall of the casing, a perforated cylindrical shell containing an absorbent material detachably mounted within said tubular glass member, and means for securing said perforated member in adjusted positions comprising a spring ring frictionally engaging said perforated member and adapted to rest upon the upper end of said tubular member.

10. A compartment receptacle comprising a casing having a base and a vertical peripheral wall extending upwardly therefrom, a plurality of partition members each having converging walls united by a narrow integral wall adapted when the partitions are assembled to provide a space between said narrow walls, and a liquid absorbent member having a rigid shell inturned at its ends supported in said space.

11. A compartment receptacle comprising a casing having a base and a vertical peripheral wall extending upwardly therefrom, a plurality of partition members each having converging walls united by a narrow integral wall adapted when the partitions are assembled to provide a space between said narrow walls, and a liquid absorbent member having a rigid shell inturned at its ends supported in said space, said absorbent member having an aperture extending longitudinally therethrough to permit uniform absorption of liquid throughout the length thereof.

FORREST G. PURINTON.
WILLIAM A. ZWIEBEL.